US010125305B2

(12) United States Patent
Al Moajil et al.

(10) Patent No.: US 10,125,305 B2
(45) Date of Patent: Nov. 13, 2018

(54) FILTER CAKE REMOVAL COMPOSITION FOR DRILLING FLUIDS AND METHOD OF USE THEREOF

(71) Applicant: Saudi Arabian Oil Company, Dhahran (SA)

(72) Inventors: Abdullah Mohammed Al Moajil, Ad Dammam (SA); Hisham A. Nasr-El-Din, College Station, TX (US)

(73) Assignee: SAUDI ARABIAN OIL COMPANY (SA)

( * ) Notice: Subject to any disclaimer, the term of this patent is extended or adjusted under 35 U.S.C. 154(b) by 0 days.

(21) Appl. No.: 15/258,091

(22) Filed: Sep. 7, 2016

(65) Prior Publication Data

US 2016/0376491 A1    Dec. 29, 2016

Related U.S. Application Data

(62) Division of application No. 13/708,546, filed on Dec. 7, 2012.

(Continued)

(51) Int. Cl.
*C09K 8/524*    (2006.01)
*C09K 8/528*    (2006.01)
(Continued)

(52) U.S. Cl.
CPC .............. *C09K 8/524* (2013.01); *C09K 8/528* (2013.01); *E21B 37/00* (2013.01); *E21B 37/08* (2013.01);
(Continued)

(58) Field of Classification Search
CPC .... C09K 2208/24; C09K 8/524; C09K 8/528; E21B 21/003; E21B 37/00; E21B 37/08
See application file for complete search history.

(56) References Cited

U.S. PATENT DOCUMENTS 4,676,916 A     6/1987  Crema
5,783,527 A *   7/1998  Dobson, Jr. .............. C09K 8/08
                                                  166/300

(Continued)

FOREIGN PATENT DOCUMENTS

CA    2677840 A1    8/2008
JP    5320204 A     12/1993
(Continued)

OTHER PUBLICATIONS

Al-Mojil, A. M. A., "Removal of Filter Cake Generated by Manganese Tetraoxide Water-Based Drilling Fluids", Thesis—Submitted to the Office of Graduate Studies of Texas A&M University, Master of Science, Published Oct. 2011 (pp. 1-73)

(Continued)

*Primary Examiner* — Alicia Bland
(74) *Attorney, Agent, or Firm* — Bracewell LLP; Constance Gall Rhebergen (57) ABSTRACT

Disclosed is a filter cake removal composition, and method of use thereof, for use in a wellbore for controlled removal of a filter cake present in a target production zone. The filter cake removal composition includes hydrochloric acid and an organic acid. The filter cake removal composition, when a mixture of the hydrochloric acid and the organic acid is applied to the filter cake in the target production zone, is operable to dissolve the filter cake in the target production zone over an extended reaction time. The mixture includes the hydrochloric acid present in an amount of between about 0.1% and 5% by weight and the organic acid present in an amount of between about 0.1% and 10% by weight.

14 Claims, 4 Drawing Sheets

Before
Cake Thickness
= 0.171 in

After
Cake Thickness
= 0.03 in

Removal efficiency by weight = 78%
Removal efficiency by difference
in brine discharge rates = 70%

Related U.S. Application Data (60) Provisional application No. 61/567,993, filed on Dec. 7, 2011, provisional application No. 61/567,983, filed on Dec. 7, 2011.

(51) Int. Cl.
  E21B 37/08 (2006.01)
  E21B 37/00 (2006.01)
  E21B 21/00 (2006.01)

(52) U.S. Cl.
  CPC ........ *C09K 2208/24* (2013.01); *E21B 21/003* (2013.01)

(56) References Cited

U.S. PATENT DOCUMENTS

| | | | |
|---|---|---|---|
| 5,881,813 A | 3/1999 | Brannon et al. | |
| 5,909,774 A * | 6/1999 | Griffith | C09K 8/32 166/291 |
| 6,068,056 A * | 5/2000 | Frenier | C09K 8/52 166/307 |
| 6,143,698 A | 11/2000 | Murphey et al. | |
| 6,248,698 B1 * | 6/2001 | Mullen | C09K 8/16 507/139 |
| 6,631,764 B2 | 10/2003 | Parlar et al. | |
| 6,715,553 B2 | 4/2004 | Reddy et al. | |
| 6,978,838 B2 | 12/2005 | Parlar et al. | |
| 7,036,590 B2 | 5/2006 | Harris | |
| 7,475,728 B2 | 1/2009 | Pauls et al. | |
| 7,514,390 B2 | 4/2009 | Chan | |
| 7,712,536 B2 | 5/2010 | Pirolli et al. | |
| 7,727,937 B2 | 6/2010 | Pauls et al. | |
| 2001/0036905 A1 | 11/2001 | Parlar et al. | |
| 2003/0216263 A1 | 11/2003 | Tibbles et al. | |
| 2004/0014606 A1 | 1/2004 | Parlar et al. | |
| 2006/0137879 A1 | 6/2006 | Chan | |
| 2007/0281868 A1 * | 12/2007 | Pauls | C09K 8/76 507/213 |
| 2009/0008095 A1 * | 1/2009 | Duncum | C09K 8/032 166/292 |
| 2009/0042750 A1 | 2/2009 | Pauls et al. | |
| 2009/0183877 A1 * | 7/2009 | Quintero | C09K 8/584 166/300 |
| 2009/0298720 A1 | 12/2009 | Nguyen et al. | |
| 2010/0212896 A1 | 8/2010 | Navarro et al. | |
| 2011/0214862 A1 | 9/2011 | Horton et al. | |

FOREIGN PATENT DOCUMENTS

| | | |
|---|---|---|
| WO | WO2003035793 A1 | 5/2003 |
| WO | WO2005113933 A2 | 12/2005 |
| WO | WO2009093196 A1 | 7/2009 |

OTHER PUBLICATIONS

International Search Report and the Written Opinion of the International Searching Authority for Int'l Appln No. PCT/US2012/068384; International Filing Date Dec. 7, 2012; Report dated Mar. 7, 2013 (pp. 1-14).

* cited by examiner

Before
Cake Thickness
= 0.171 in

After
Cake Thickness
= 0.03 in

Removal efficiency by weight = 78%
Removal efficiency by difference
in brine discharge rates = 70%

Removal efficiency by weight = 84%

| Before | After 9.5 hr | After 18 hr | After 22 hr |
| Cake Thickness | Cake Thickness | Cake Thickness | Cake Thickness |
| 0.174 in | 0.157 in | 0.026 in | 0.024 in |

FILTER CAKE REMOVAL COMPOSITION FOR DRILLING FLUIDS AND METHOD OF USE THEREOF

RELATED APPLICATION

This application is a divisional application of U.S. patent application Ser. No. 13/708,546, filed on Dec. 7, 2012, which claims priority to U.S. Provisional Patent Application Nos. 61/567,983 and 61/567,993, both provisional applications filed on Dec. 7, 2011, the disclosures of which are incorporated herein by reference in their entirety.

BACKGROUND

Field of the Invention

Embodiments of the invention generally relate to methods and compositions for removing a completion fluid filter cake in a wellbore, and more particularly, to methods and compositions for dissolving or removing filter cake material generated by a manganese-tetraoxide-based drilling fluid in a wellbore for optimizing production from a surrounding hydrocarbon bearing formation.

Description of the Related Art

Horizontally/multilaterally-drilled wells have been used to enhance both hydrocarbon recovery and total well productivity from many types of reservoirs. Drilling, workover, and production operations may result in near-wellbore formation damage that in most cases cannot be prevented (e.g., pore plugging by calcium carbonate particles from drilling fluid, drilled solid particles, or particles from the formation).

During well operations, drilling fluids can be lost into the surrounding formation. To prevent this, the drilling fluid is frequently modified such that a small amount of the fluid and solids contained therein form a coating on a wellbore surface (i.e., the formation of a "filter cake"). After the completion of drilling operations, the coating or filter cake is typically removed, and production from the formation can proceed. The process used to remove the filter cake can also be used to remove other types of damage or debris from the wellbore prior to beginning hydrocarbon production.

To facilitate the drilling of horizontal/multilateral wells, weighting materials have been introduced into the drilling fluid to increase the density of the drilling fluid for balancing the hydrostatic pressure and for maintaining stability within the wellbore to minimize formation damage and corrosion in the wellbore. Several weighting materials (e.g., bentonite, barite, calcium carbonate ($CaCO_3$) ilmenite, and hematite) have been used in drilling fluids, each of which has several associated limitations. For example, bentonite and barite are not soluble in hydrochloric acid (HCl), and therefore they may cause formation damage in the wellbore. The specific gravity of $CaCO_3$ (e.g., 2.71) limits its application when a high density drilling fluid is needed to drill deep wells. Due to the partial solubility of barite in concentrated formate brines and the conventional practice not to acidize the wellbore prior to completion of the well, $CaCO_3$ and barite have been excluded as options to increase density of the drilling fluid in many applications.

Manganese tetraoxide ($Mn_3O_4$) is a high density, acid-soluble weighting material useful in drilling fluids for drilling high temperature/high pressure (HT/HP) wells. $Mn_3O_4$ is spherical in shape and has an average partial size of 1-5 microns and a specific gravity of 4.8, which make it appropriate for drilling deep wells. For example, $Mn_3O_4$ has been introduced into potassium formate drilling fluids to overcome the main drawback of potassium formate, which is the production of a brine of density 1.7 $g/cm^3$ (106 $lb/ft^3$). $Mn_3O_4$ has also been introduced as a weighting material into oil-based drilling fluids due to its ability to lower the plastic viscosity of the oil-based drilling fluid. A water-based drilling fluid weighted with $Mn_3O_4$ and a small amount of $CaCO_3$ has also been formulated for use in a wellbore. $CaCO_3$ has been added to the water-based drilling fluid to control filtration properties of the drilling fluid. The need in the industry for a drilling fluid with high rheological properties has been achieved using $Mn_3O_4$ particles.

$Mn_3O_4$ particles, however, also present many disadvantages as a weighting material in oil-based or water-based drilling fluids. For example, $Mn_3O_4$ particles aggregate up to 20 microns in aqueous and oil-based fluids. Accumulation of these aggregates in the critical near wellbore area can result in stuck pipe and mud cake problems during drilling operations. Dust problems associated with the accumulation of these aggregates have also caused formation damage in the wellbore. Additionally, starch may be present in the filter cake covered $Mn_3O_4$ particles, which can contribute to additional particle agglomeration. Thus, addressing the removal of a filter cake formed by a drilling fluid weighted with $Mn_3O_4$ particles is essential to ensure the effectiveness of drilling and cleaning operations in the wellbore.

Several cleaning compositions have been developed to remove the filter cake generated by a manganese-tetraoxide-based drilling fluid from the wellbore and to minimize formation damage in the wellbore using live acids, gelled acids, strongly buffered organic acids, chelating agents, oxidizing agents, enzymes, in-situ generated organic acids, microemulsions, or combinations of these chemicals. Because $Mn_3O_4$ is a strong oxidizing agent having an active phase (i.e., a tetragonal symmetry, non-stoichiometry behavior) locally composed of an octahedral $Mn_2O_3$ phase and a tetrahedral MnO phase, it experiences complex interactions with most cleaning fluids, including the aforementioned chemicals. For example, organic acids and chelating agents will not independently dissolve $Mn_3O_4$-based filter cakes. Ethylene diamine tetracetic acid (EDTA) at high pH (e.g., a pH of 12) and acetic, propionic, butyric, and gluconic acids at low pH (e.g., a pH of 3-5) exhibit very low solubility. Glutamic, citric, oxalic, and tartaric acids produce white precipitation when reacted with $Mn_3O_4$ particles. Similarly, diethylene triaminen pentaacetic acid (DTPA) precipitates manganese silicate if used to dissolve $Mn_3O_4$-based filter cake in a sandstone formation.

Citric acid in an amount of about 10% by weight has been used as a cleaning fluid for effectively removing $Mn_3O_4$-based filter cakes. However, when reacted with $Mn_3O_4$, citric acid has been known to dissociate insoluble manganese citrate causing formation damage in the wellbore, and therefore is not a suitable composition to effectively dissolve or remove the $Mn_3O_4$-based filter cake from the wellbore while preventing formation damage.

Therefore, what is needed is a filter cake removal composition which dissolves, and more preferably removes, a filter cake generated by a manganese-tetraoxide-based drilling fluid without causing formation damage in the wellbore.

SUMMARY

Embodiments of the invention are directed to compositions, and methods of use thereof, for dissolving or removing filter cake material generated by a manganese-tetraoxide-based drilling fluid in a wellbore for optimizing production from a surrounding hydrocarbon bearing formation. An embodiment of the invention includes a filter cake removal composition including HCl having a concentration lower than 5% by weight for partially dissolving the $Mn_3O_4$-based filter cake. According to another embodiment of the invention, a two-stage filter cake removal composition is provided which includes an enzyme that is first applied to the filter cake, followed by the application of an organic acid to the resulting filter cake. In accordance with another embodiment of the invention, there is provided a single-stage filter cake removal composition including a mixture of HCl and an organic acid for dissolving a portion of the filter cake in the wellbore, which will be described in more detail below. According to another embodiment of the invention, there is provided a two-stage filter cake removal composition that has been demonstrated to remove filter cake material generated by a manganese-tetraoxide-based drilling fluid in a wellbore using the application of an amylase enzyme in a first stage, followed by the application of a mixture of HCl and an organic acid in a second stage, which will also be described in further detail below. Methods of use of the latter two filter cake removal compositions will also be described in further detail below.

In particular, there is provided a filter cake removal composition, in accordance with an embodiment of the invention, for use in a wellbore for controlled removal of a filter cake present in a target production zone. The filter cake removal composition includes hydrochloric acid and an organic acid. The filter cake removal composition, when a mixture of the hydrochloric acid and the organic acid is applied to the filter cake in the target production zone, is operable to dissolve the filter cake in the target production zone over an extended reaction time. The mixture includes the hydrochloric acid present in an amount of between about 0.1% and 5% by weight and the organic acid present in an amount of between about 0.1% and 10% by weight.

In accordance with another embodiment of the invention, there is provided a method for the controlled removal of a filter cake from a target production zone of a wellbore using a filter cake removal composition. The method includes delivering the filter cake removal composition to the target production zone. The step of delivering the filter cake removal composition includes applying the filter cake removal composition to the filter cake for an extended reaction time during which extended time the filter cake removal composition acts to dissolve the filter cake and after which extended time the filter cake removal composition acts to control fluid loss from the wellbore into the target production zone. The step of delivering the filter cake removal composition further includes applying a mixture of hydrochloric acid and an organic acid to the filter cake in the target production zone. The mixture includes the hydrochloric acid present in an amount of between about 0.1% and 5% by weight and the organic acid present in an amount of between about 0.1% and 10% by weight.

BRIEF DESCRIPTION OF DRAWINGS

So that the manner in which the features and advantages of the invention, as well as others which will become apparent, may be understood in more detail, a more particular description of the invention briefly summarized above may be had by reference to the embodiments thereof which are illustrated in the appended drawings, which form a part of this specification. It is to be noted, however, that the drawings illustrate only various embodiments of the invention and are therefore not to be considered limiting of the invention's scope as it may include other effective embodiments as well.

DETAILED DESCRIPTION

Although the following detailed description contains many specific details for purposes of illustration, it is understood that one of ordinary skill in the relevant art will appreciate that many examples, variations, and alterations to the following details are within the scope and spirit of the invention. Accordingly, the exemplary embodiments of the invention described herein are set forth without any loss of generality, and without imposing limitations, relating to the claimed invention. Like numbers refer to like elements throughout. Prime notation, if used, indicates similar elements in alternative embodiments.

As used herein, the term "drilling fluid" shall be used to collectively refer to a completion fluid or a drilling fluid. As understood in the art, "drilling fluid" shall be used to describe a fluid used to aid in the drilling of a borehole for a well (e.g., a horizontal/multilateral well). The drilling fluid may include a water-based mud (e.g., a dispersed or non-dispersed water-based mud), a non-aqueous mud (e.g., an oil-based mud), and a gaseous drilling fluid.

Experimentation of conventional cleaning fluids demonstrates that $Mn_3O_4$ deposits dissolve in concentrated (e.g., ~12N) or dilute (e.g., ~3N) HCl solutions. The reaction of HCl with $Mn_3O_4$ depends on the stoichiometry of the reactants as shown, for example, in Equations (1)-(3):

$$Mn_3O_4 + 8HCl \rightleftharpoons 2MnCl_2 + MnCl_4 + 4H_2O \quad (1)$$

$$3Mn_3O_4 + 12HCl \rightleftharpoons 6MnCl_2 + MnO_2 + 6H_2O \quad (2)$$

$$Mn_3O_4 + 6HCl \rightleftharpoons MnCl_2 + MnCl_4 + 3H_2O \quad (3)$$

Embodiments of the invention demonstrate that HCl in an amount of about 10% by weight may dissolve about 78% by weight of a $Mn_3O_4$-based filter cake at about 250° F. after 28 hours of soaking the filter cake material. However, corrosive/poisonous chlorine gas is detected during the reaction of between about 5 and 15% by weight of HCl with $Mn_3O_4$, as given, for example, by Equation (4):

$$Mn_3O_4 + 8HCl \rightleftharpoons 3MnCl_2 + Cl_2 + 4H_2O \quad (4)$$

Certain embodiments of the invention demonstrate that, at about 190° F., an amount of between about 1 and 4% by weight HCl may dissolve most of the $Mn_3O_4$ particles in the filter cake (e.g., up to about 70% by weight solubility), without the release of chlorine gas. The reaction of HCl in an amount of between about 1 and 4% by weight and $Mn_3O_4$ particles at about 190° F. may be represented by equation (5):

$$Mn_3O_4 + 4HCl \rightleftharpoons 2MnCl_2 + MnO_2 + 2H_2O \qquad (5)$$

Therefore, HCl at a concentration of less than about 5% by weight will partially dissolve a $Mn_3O_4$-based filter cake.

Embodiments of the invention further demonstrate that about 4% by weight of an organic acid, such as lactic or formic acid, as non-limiting examples, may dissolve $Mn_3O_4$ particles up to about 76% by weight solubility at about 190° F. However, it has been observed that the $Mn_3O_4$ particles of the filter cake were covered with polymeric material (e.g., starch), which significantly reduces the solubility of the filter cake in the organic acids. Therefore, there is a need to remove the polymeric material on the $Mn_3O_4$ particles of the filter cake to more effectively dissolve or remove the filter cake material in the wellbore. Certain embodiments of the invention provide for the application of an enzyme (i.e., an enzyme that catalyzes the breakdown of starch into sugars) to remove the polymeric material present on the $Mn_3O_4$ particles of the filter cake.

Certain embodiments of the invention provide for a filter cake removal composition, and method of use thereof, for use in a wellbore for the controlled removal of a filter cake present in a target production zone. Generally, the filter cake removal composition includes low and safe concentrations of HCl combined with an organic acid. The filter cake removal composition, when a mixture of the HCl and the organic acid is delivered or applied to the filter cake in the target production zone, may be operable to dissolve the filter cake in the target production zone over an extended reaction time, and subsequently may be operable to control fluid loss from the wellbore into the target production zone. For example, the filter cake removal composition can be delivered or applied to the filter cake in a single-stage treatment, whereby the filter cake is allowed to soak in the cleaning fluid for up to about 24 hours. According to an embodiment of the invention, the hydrochloric acid is present in an amount of between about 0.1% and 5% by weight and the organic acid in an amount of between about 0.1% and 10% by weight.

In accordance with another embodiment of the invention, the hydrochloric acid is preferably present in an amount of about 1% by weight. The organic acid may be selected from the group consisting of formic acid, lactic acid, and malonic acid. In accordance with another embodiment of the invention, the organic acid includes lactic acid and is preferably present in an amount of about 4% by weight.

According to one embodiment of the invention, about 1% by weight HCl combined with about 4% by weight lactic acid may dissolve, in a single stage treatment of the filter cake, about 85% by weight of the $Mn_3O_4$-based filter cake after about 18-22 hours of soaking at a temperature of about 250° F. According to other embodiments, the single stage treatment of the $Mn_3O_4$-based filter cake is performed in a reservoir having temperatures higher than 250° F., while in other embodiments, the reservoir has a temperature lower than 250° F.

Other embodiments of the invention provide a two-stage filter cake removal composition, and method of use thereof, for use in the wellbore for controlled removal of the filter cake present in the target production zone. Generally, the two-stage filter cake removal composition includes an enzyme and a mixture of HCl and an organic acid. The two-stage filter cake removal composition, when the enzyme is delivered or applied to the filter cake in the target production zone in a first stage and the mixture of the hydrochloric acid and the organic acid is applied to the filter cake in the target production zone in a second stage, is operable to remove the filter cake in the target production zone over an extended reaction time. Subsequently, the delivery or application of the two-stage filter cake removal composition is operable to control fluid loss from the wellbore into the target production zone.

In accordance with an embodiment of the invention, the enzyme includes an enzyme that catalyzes the breakdown of starch into sugars to remove the polymeric material present on the $Mn_3O_4$ particles of the filter cake for more effectively dissolving or removing the filter cake material in the wellbore. According to an embodiment of the invention, the enzyme includes an amylase enzyme present in an amount of between about 1% and 20% by weight. The amylase enzyme may include, for example, an α-amylase enzyme, a β-amylase enzyme, or a γ-amylase enzyme. In a preferred embodiment, the enzyme of the two-stage filter cake removal composition is an a-amylase enzyme present in an amount of about 10% by weight.

In accordance with another embodiment of the invention, the hydrochloric acid is present in an amount of between about 0.1% and 5% by weight, and more preferably in an amount of between about 1 and 10% by weight.

In accordance with another embodiment of the invention, the organic acid includes a carboxylic acid present in an amount of between about 0.1% and 5% by weight, and more preferably the organic acid is a carboxylic acid selected from the group consisting of formic acid, lactic acid, and malonic acid. In one embodiment, the organic acid includes one of formic acid and lactic acid present in an amount of about 4% by weight.

In accordance with certain embodiments of the invention, the enzyme is applied to the filter cake in the target production zone for a predetermined period of time based on one of a characteristic of the filter cake, an enzyme type, concentration of the enzyme, and the thermal stability of the enzyme. For example, the enzyme may be applied to the filter cake for a predetermined period of time of up to about 24 hours, and more preferably for about 16-24 hours.

In accordance with certain embodiments of the invention, the concentrations of the enzyme, the HCl, and the organic acid are based on one or more factors, including, but not limited to, the reservoir temperature, formation mineralogy and composition, filter cake characteristics and composition, enzyme activity, and thermal stability.

EXAMPLES

The examples described below show certain exemplary embodiments of the filter cake removal composition of the present invention, as described herein. As shown in Table 1, water-based drilling fluids primarily weighted with $Mn_3O_4$ and a small amount of $CaCO_3$ particles to control a leak-off rate were prepared to demonstrate the efficacy of the filter cake removal composition, in accordance with certain embodiments of the invention, for dissolving or removing filter cake material in a wellbore. Xanthan, starch, and polyanionic cellulose (PAC-R) polymers were added to the mud to control fluid loss and rheological properties of the drilling fluid. Lime ($Ca(OH)_2$) and potassium hydroxide (KOH) were added to adjust the pH of the drilling fluid. Sodium sulfite ($Na_2SO_3$) was added to the drilling fluid as an oxygen scavenger.

TABLE 1

TABLE 1-FORMULATION OF DRILL-IN FLUID

| | | Amount added | | | |
|---|---|---|---|---|---|
| | | Lab units (per ~320 cm³) | | Field unit (per bbl) | |
| Additive | Function | Quantity | Unit | Quantity | Unit |
| DI Water | Base | 287.7 | cm³ | 0.822 | bbl |
| Xanthan | Viscosifier | 1 | G | 1 | lb |
| Starch | Fluid loss control agent | 6 | G | 6 | lb |
| PAC-R | Viscosifier/fluid loss | 0.75 | G | 0.75 | lb |
| KCl | Density and shale inhibition | 41 | G | 41 | lb |
| KOH | pH control | 0.5 | G | 0.5 | lb |
| Ca(OH)$_2$ | pH control | 0.25 | G | 0.25 | lb |
| CaCO$_3$ (Fine) | Weighting material | 3.5 | G | 3.5 | lb |
| CaCO$_3$ (Medium) | Weighting material | 1.5 | G | 1.5 | lb |
| Mn$_3$O$_4$ | Weighting material | 202 | G | 202 | lb |
| Na$_2$SO$_3$ | Oxygen scavenger | 0.75 | G | 0.75 | lb |

Table 2 summarizes the main properties of the prepared manganese-tetraoxide-based drilling fluid shown above in Table 1.

TABLE 2

TABLE 2-PROPERTIES OF $Mn_3O_4$ DRILL-IN FLUID

| Property | Conditions | Unit | Value |
|---|---|---|---|
| Density | 80° F. and 14.7 psi | lb/ft³ | 95 |
| Plastic viscosity | 120° F. and 14.7 psi | cp | 27 |
| Yield point | | lb/100 ft² | 38 |
| API filtrate | | cm³/30 min | 6.5 |
| Cake thickness | Static at 75° F. and 100 psi | In | 1/32 |
| HPHT filtrate | Dynamic at 250° F. and 200 psi | cm³/30 min | 13.6-20.3 |
| Cake thickness | 3 µm, 400 md ceramic disc | In | 0.24-0.29 |
| pH | — | — | 10-11 |

Figure 1:
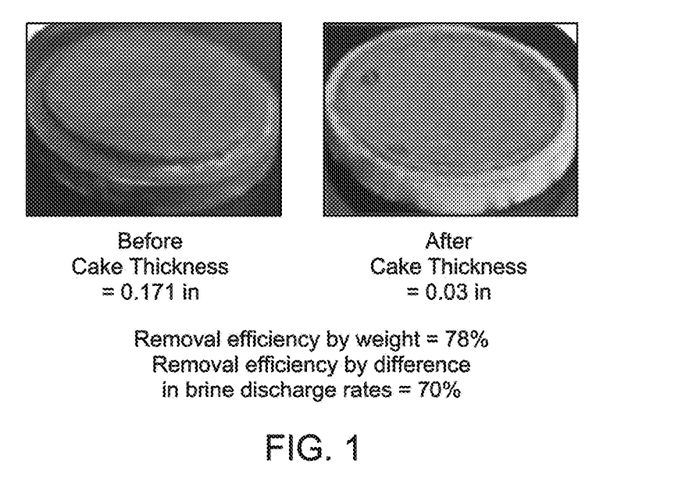
FIG. 1 shows a filter cake before and after an application of a filter cake removal composition, including 10% by weight HCl, in accordance with an embodiment of the invention.
Figure 2:
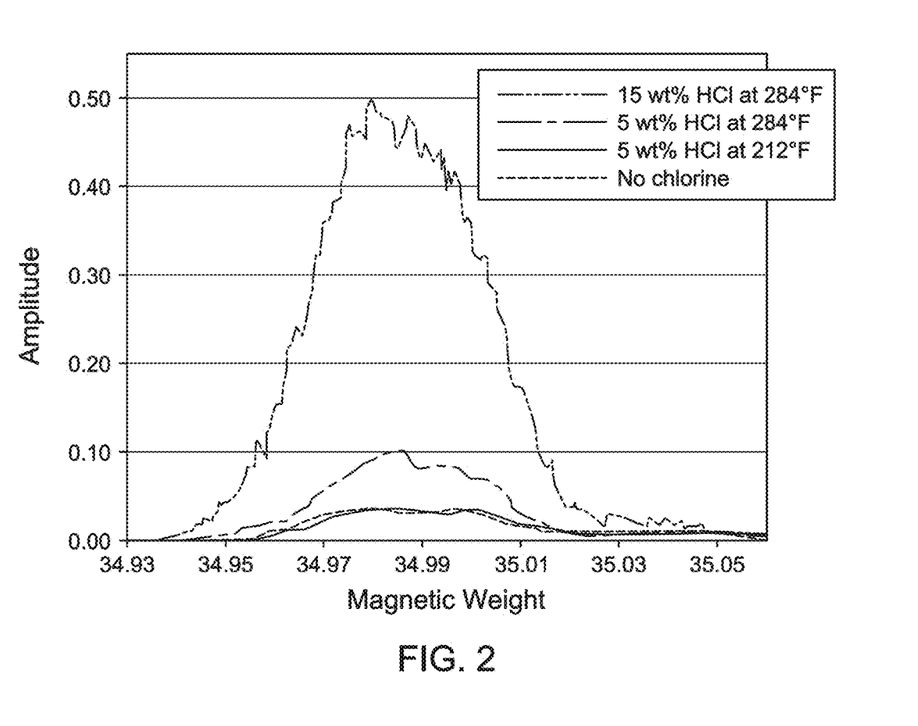
FIG. 2 shows a gas chromatography/mass spectrometry graph illustrating the relationship between the reaction of HCl with $Mn_3O_4$ particles and the production of chlorine gas, in accordance with an embodiment of the invention.
Figure 3:
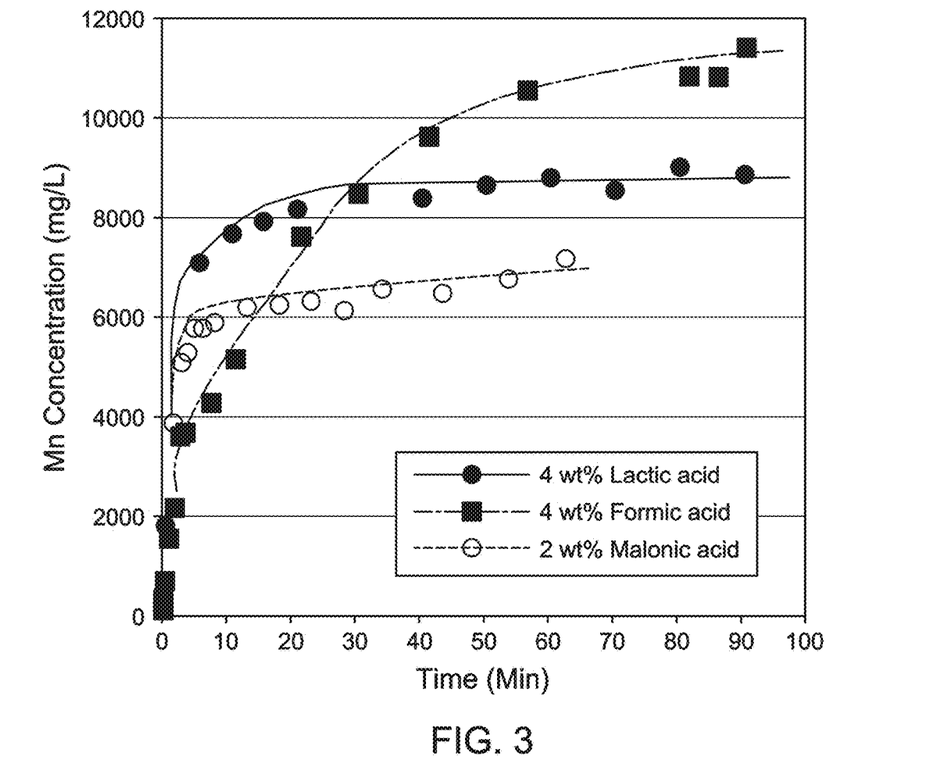
FIG. 3 is a graph showing the effect of $Mn_3O_4$-high soluble organic acids on the dissolution of manganese ions, in accordance with an embodiment of the invention.

According to various embodiments of the invention, HCl is effective for dissolving $Mn_3O_4$ particles and the $Mn_3O_4$-based filter cake. For example, as shown in FIG. 1, HCl in an amount of about 10% by weight may dissolve about 78% by weight of a $Mn_3O_4$-based filter cake at about 250° F. and about 250 psi after about 28 hours of soaking time (i.e., a filter cake thickness of about 0.171 in. prior to delivery or application of the filter cake removal composition; a filter cake thickness of about 0.03 in. after delivery or application of the filter cake removal composition). However, as discussed above, chlorine gas is detected during the reaction of between about 5 to 15% by weight HCl with $Mn_3O_4$ particles. FIG. 2 shows a gas chromatography/mass spectrometry graph illustrating chlorine gas produced during the reaction of between about 5 to 15% by weight HCl with $Mn_3O_4$ particles at about 284° F. As shown in FIG. 2, HCl should not be used at concentrations higher than 5% by weight in order to prevent the production of chlorine gas. At HCl concentrations lower than 5% by weight, however, the filter cake removal efficiency by weight is only about 50% by weight, and therefore is not much more efficient than conventional cleaning fluids.

Table 3 shows the solubility of $Mn_3O_4$ particles in HCl at 1%, 4%, and 10% by weight HCl at about 190° F. Table 3 shows that a concentration of HCl of about 4% by weight is effective, however, at dissolving a portion of the $Mn_3O_4$-solid particles in the filter cake (e.g., about 70% by weight) without producing chlorine gas, even though as shown in FIG. 2, this concentration of HCl does not allow for a filter cake removal efficiency that is much greater than conventional cleaning fluids.

TABLE 3

TABLE 3-SOLUBILITY OF $Mn_3O_4$ PARTICLES IN HCl ACID SOLUTIONS, 190° F.

| HCl Concentration, wt % | Dissolved solids, wt % | Weight of retained solids after reaction, g | Manganese Concentration, mg/l |
|---|---|---|---|
| 1 | 56 | 1.76 | ~7,500 |
| 4 | 70 | 1.2 | ~8,500 |
| 10 | 100 | 0 | ~18,000 |

Embodiments of the invention further demonstrate that organic acids may be used to dissolve or remove $Mn_3O_4$ particles from the filter cake. As shown in Table 4, at about 4% by weight acid concentration, organic acids, such as lactic and formic acids, as non-limiting examples, may dissolve $Mn_3O_4$ particles up to 76% by weight solubility at about 190° F. Malonic acid may be used to dissolve $Mn_3O_4$ particles in the filter cake, but it may not be as effective as formic and lactic acids (i.e., only about 50% by weight of the $Mn_3O_4$-solid particles in the filter cake are dissolved).

TABLE 4

TABLE 4-SOLUBILITY OF $Mn_3O_4$ PARTICLES (4 g) IN ORGANIC ACIDS SOLUTIONS (200 g), 190° F.

| Acid type (concentration, wt %) | Dissolved solids, wt % | Manganese Concentration, mg/l | % of Consumed acid |
|---|---|---|---|
| 4 wt % lactic acid + 1 wt % HCl | 99 | 14,600 at 10 min | 66.5 |
| Formic (4) | 76.4 | 11,000 at 70 min | 52.6 |
| Lactic acid (4) | 70.2 | 8,900 at 35 min | 75.9 |
| Malonic (2) | 53.73 | 6,600 at 25 min | 60 |

In a preferred embodiment of the invention, a mixture of HCl, for example, in an amount of about 0.1% and about 5% by weight, and the organic acid, for example, in an amount of about 0.1% and about 10% by weight, is delivered or applied to the filter cake in a target production zone of a wellbore. As shown in Table 4, for example, a mixture of 1% by weight HCl and 4% by weight lactic acid may dissolve about 99% by weight of the $Mn_3O_4$-solid particles in the filter cake. As previously discussed, this mixture of HCl and lactic acid may be operable to dissolve about 85% by weight of the filter cake.

Certain embodiments of the invention provide a two-stage filter cake removal composition for controlled removal of a filter cake present in a target production zone. As previously discussed above, $Mn_3O_4$ particles in the filter cake may be covered with polymeric material (e.g., starch), which significantly reduces the solubility of the filter cake in organic acids. In order to remove the polymeric material, embodiments of the invention provide a two-stage filter cake removal composition which includes the application of an enzyme in a first stage and the application of a mixture of HCl and an organic acid in a second stage.

Figure 4:
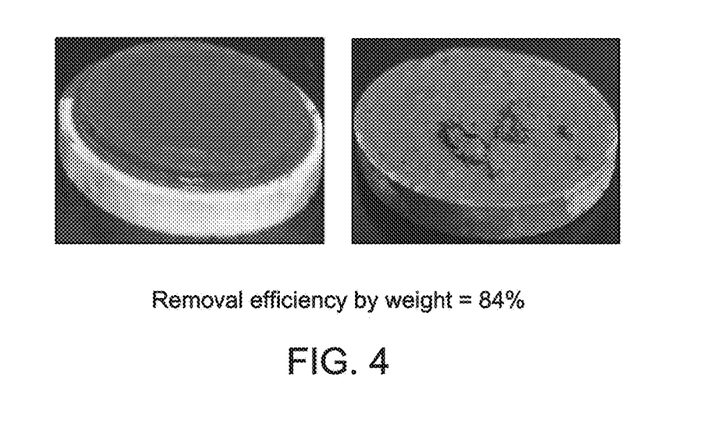
FIG. 4 shows a filter cake before and after an application of a two-stage filter cake removal composition, in accordance with an embodiment of the invention

Experimentation demonstrates that an amylase enzyme in an amount of about 10% by weight and an in-situ lactic acid in an amount of about 10% by weight may dissolve about 84% by weight of the filter cake at about 244° F. after soaking the filter cake in the organic acid for about 24 hours (see FIG. 4). The enzyme soaking stage time is about 4 days. Dissolving the filter cake created by $Mn_3O_4$ water-based drilling fluids using a two-stage treatment may increase the time of the treatment (e.g., 1-4 days for the enzyme stage alone) depending on various factors, for example, filter cake polymeric composition, enzyme type, concentration and thermal stability, as non-limiting examples. Adding HCl to the second stage of the treatment reduces the required enzyme and organic acid concentrations and the soaking time to about 24 hours for each stage.

For example, the two-stage filter cake removal composition, in accordance with certain embodiments of the invention, provides complete solubility of the $Mn_3O_4$ particles (e.g., about 99% by weight) in the filter cake, when a mixture of low and safe concentrations of HCl, for example, in an amount of about 1% by weight, and an organic acid, for example, of about 4% by weight of lactic acid, is applied to a filter cake after the filter cake is treated with an initial stage of an enzyme, for example, an amylase enzyme in an amount of about 10% by weight, which dissolves about 85% by weight of the $Mn_3O_4$-based filter cake after about 18 hours soaking time at about 250° F.

Figure 5:
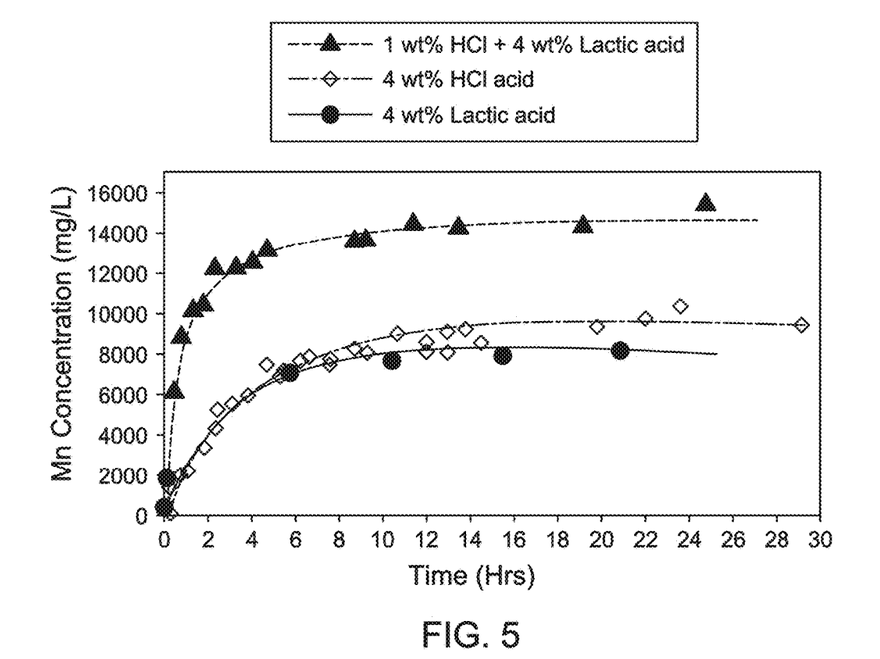
FIG. 5 shows a graph illustrating the efficacy of a mixture of HCl and lactic acid for the dissolution of manganese ions from a $Mn_3O_4$-based filter cake, in accordance with an embodiment of the invention.
Figure 6:
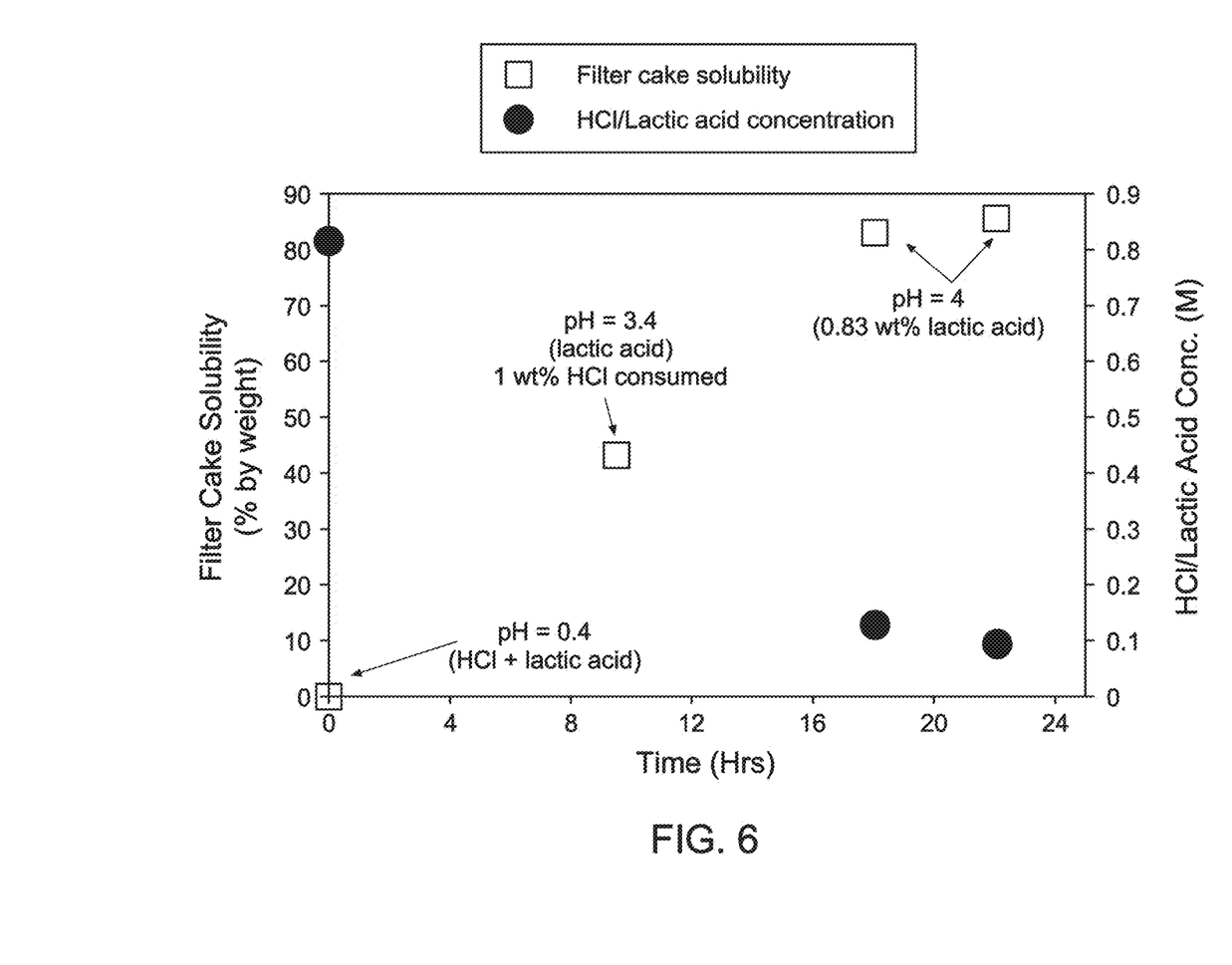
FIG. 6 shows a graph illustrating the solubility of a $Mn_3O_4$-based filter cake and acid concentration as a function of time using a two-stage filter cake removal composition, in accordance with an embodiment of the invention.
Figure 7:
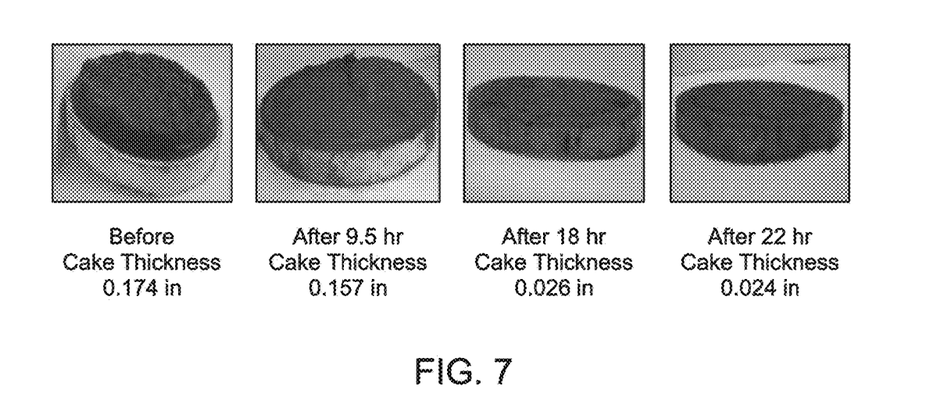
FIG. 7 shows the efficacy of a single-stage filter cake removal composition, in accordance with an embodiment of the invention, for removing $Mn_3O_4$ particles from a filter cake.

FIG. 5 shows a graph illustrating that a mixture of HCl and lactic acid may be more effective in the dissolution of manganese ions from the $Mn_3O_4$-based filter cake than with a treatment of only lactic acid or only HCl, in accordance with an embodiment of the invention. FIG. 6 shows a graph illustrating the solubility of the $Mn_3O_4$-based filter cake and acid concentration as a function of time using the mixture of about 1% by weight HCl and about 4% by weight lactic acid at about 250° F. and about 250 psi. FIG. 7 shows a filter cake thickness of about 0.174 in. prior to delivery or application of the single-stage filter cake removal composition, in accordance with an embodiment of the invention, and a filter cake thickness of about 0.026 in and about 0.024 in. after soaking the $Mn_3O_4$-based filter cake in the two-stage filter cake removal composition for about 18 hours and about 22 hours, respectively. No enzyme was used in the filter cake removal composition represented by FIGS. 6 and 7.

Embodiments of the present invention may suitably comprise, consist or consist essentially of the elements disclosed and may be practiced in the absence of an element not disclosed. For example, it can be recognized by those skilled in the art that certain steps can be combined into a single step.

Unless defined otherwise, all technical and scientific terms used have the same meaning as commonly understood by one of ordinary skill in the art to which this invention belongs.

The singular forms "a," "an," and "the" include plural referents, unless the context clearly dictates otherwise.

As used herein and in the appended claims, the words "comprise," "has," and "include" and all grammatical variations thereof are each intended to have an open, non-limiting meaning that does not exclude additional elements or steps.

Ranges may be expressed herein as from about one particular value, and/or to about another particular value. When such a range is expressed, it is to be understood that another embodiment is from the one particular value and/or to the other particular value, along with all combinations within said range.

Although the present invention has been described in detail, it should be understood that various changes, substitutions, and alterations can be made hereupon without departing from the principle and scope of the invention. Accordingly, the scope of the present invention should be determined by the following claims and their appropriate legal equivalents.

What is claimed is:

1. A method for the controlled removal of a manganese-tetraoxide-based filter cake from a target production zone of a wellbore using a filter cake removal composition, the method comprising:
   delivering the filter cake removal composition to the target production zone,
   wherein the delivering comprises applying the filter cake removal composition to the manganese-tetraoxide-based filter cake for an extended reaction time during which extended time the filter cake removal composition acts to dissolve the manganese-tetraoxide-based filter cake and after which extended time the filter cake removal composition acts to control fluid loss from the wellbore into the target production zone,
   wherein the delivering comprises applying a mixture of hydrochloric acid and an organic acid to the manganese-tetraoxide-based filter cake in the target production zone,
   wherein the mixture comprises the hydrochloric acid present in an amount of between about 0.1% and 5% by weight and the organic acid present in an amount of between about 0.1% and 10% by weight, and
   wherein the organic acid is lactic acid.

2. The method of claim 1, wherein the delivering further comprises applying the mixture to the manganese-tetraoxide-based filter cake in the target production zone, wherein the mixture comprises the hydrochloric acid present in an amount of about 1% by weight.

3. The method of claim 1, wherein the delivering further comprises applying the mixture to the manganese-tetraoxide-based filter cake in the target production zone.

4. The method of claim 1, wherein the delivering further comprises applying the mixture to the manganese-tetraoxide-based filter cake in the target production zone, wherein the mixture comprises the organic acid present in an amount of about 4% by weight.

5. The method of claim 1, wherein the delivering further comprises applying the mixture of the hydrochloric acid present in an amount of about 1% by weight and the organic acid present in an amount of about 4% by weight.

6. The method of claim 1, wherein the delivering further comprises applying the mixture of the hydrochloric acid and the organic acid to the manganese-tetraoxide-based filter cake in the target production zone in a single treatment for about 18 hours at about 250° F.

7. A method for removing a manganese-tetraoxide-based filter cake without generating chlorine gas, the method comprising:
   applying a filter cake removal composition to the manganese-tetraoxide-based filter cake such that at least a portion of the manganese tetraoxide in the manganese-tetraoxide-based filter cake is dissolved without the release of the chlorine gas, where the filter cake removal composition comprises hydrochloric acid in an amount between about 0.1% and 5% by weight and an organic acid in an amount between about 0.1% and 10% by weight of the filter cake removal composition, wherein the organic acid is lactic acid.

8. The method of claim 7, wherein at least 70% by weight of the manganese tetraoxide in the manganese-tetraoxide-based filter cake is dissolved.

9. The method of claim 7, wherein at least 85% by weight of the manganese tetraoxide in the manganese-tetraoxide-based filter cake is dissolved in a period of between about 18 to 22 hours at a temperature of about 250° F.

10. The method of claim 7, wherein at least 99% by weight of the manganese tetraoxide in the manganese-tetraoxide-based filter cake is dissolved at about 190° F.

11. The method of claim 7, wherein at least 85% by weight of the manganese tetraoxide in the manganese-tetraoxide-based filter cake is dissolved.

12. The method of claim 7, further comprising:
the step of generating a filter cake from a drilling mud comprising manganese tetraoxide.

13. The method of claim 12, wherein the drilling mud is selected from the group consisting of a water-based mud, a non-aqueous mud, and a gaseous drilling fluid.

14. The method of claim 7, further comprising:
the step of controlling fluid loss into a target production zone using the remainder of the filter cake removal composition comprising dissolved manganese-tetraoxide-based filter cake.

\* \* \* \* \*